United States Patent [19]

Fleuren

[11] Patent Number: 5,438,815
[45] Date of Patent: Aug. 8, 1995

[54] PROCESS FOR PRODUCTION OF SPACER MEANS FOR POSITIONING BETWEEN ARTICLES

[76] Inventor: Norbert Fleuren, Gocher Str. 27, D-47559 Kranenburg, Germany

[21] Appl. No.: 162,460

[22] Filed: Dec. 3, 1993

[51] Int. Cl.⁶ .................. B65B 35/54; B65B 61/00; B65B 17/00
[52] U.S. Cl. .................................. 53/398; 53/157; 53/263; 53/445
[58] Field of Search ............... 53/398, 48.1, 445, 263, 53/543, 157, 156

[56] References Cited

U.S. PATENT DOCUMENTS

| | | | |
|---|---|---|---|
| 2,013,555 | 9/1935 | Deeren | 53/157 X |
| 2,117,281 | 5/1938 | Bravi | 53/157 X |
| 3,589,101 | 6/1971 | Bavinck | 53/157 X |
| 4,250,684 | 2/1981 | Clegg | 53/157 |
| 4,584,821 | 4/1986 | Booth | 53/157 X |

Primary Examiner—James F. Coan
Attorney, Agent, or Firm—Mason, Kolehmainen, Rathburn & Wyss

[57] ABSTRACT

An arrangement of spacer means for positioning between articles such as containers comprises at least one spacer portion which is adapted to extend in an upstanding position in a substantially meander-like configuration as viewed in plan between the articles which are arranged in a row. The spacer portion can be formed by a process wherein a straight portion is introduced between two rows of articles, with the articles of one row being in displaced relationship with the articles of the other row. The two rows of articles are then moved together so as to constitute a common row, thereby deforming the straight portion into a portion of meander-like configuration extending between the articles for holding them in position.

5 Claims, 2 Drawing Sheets

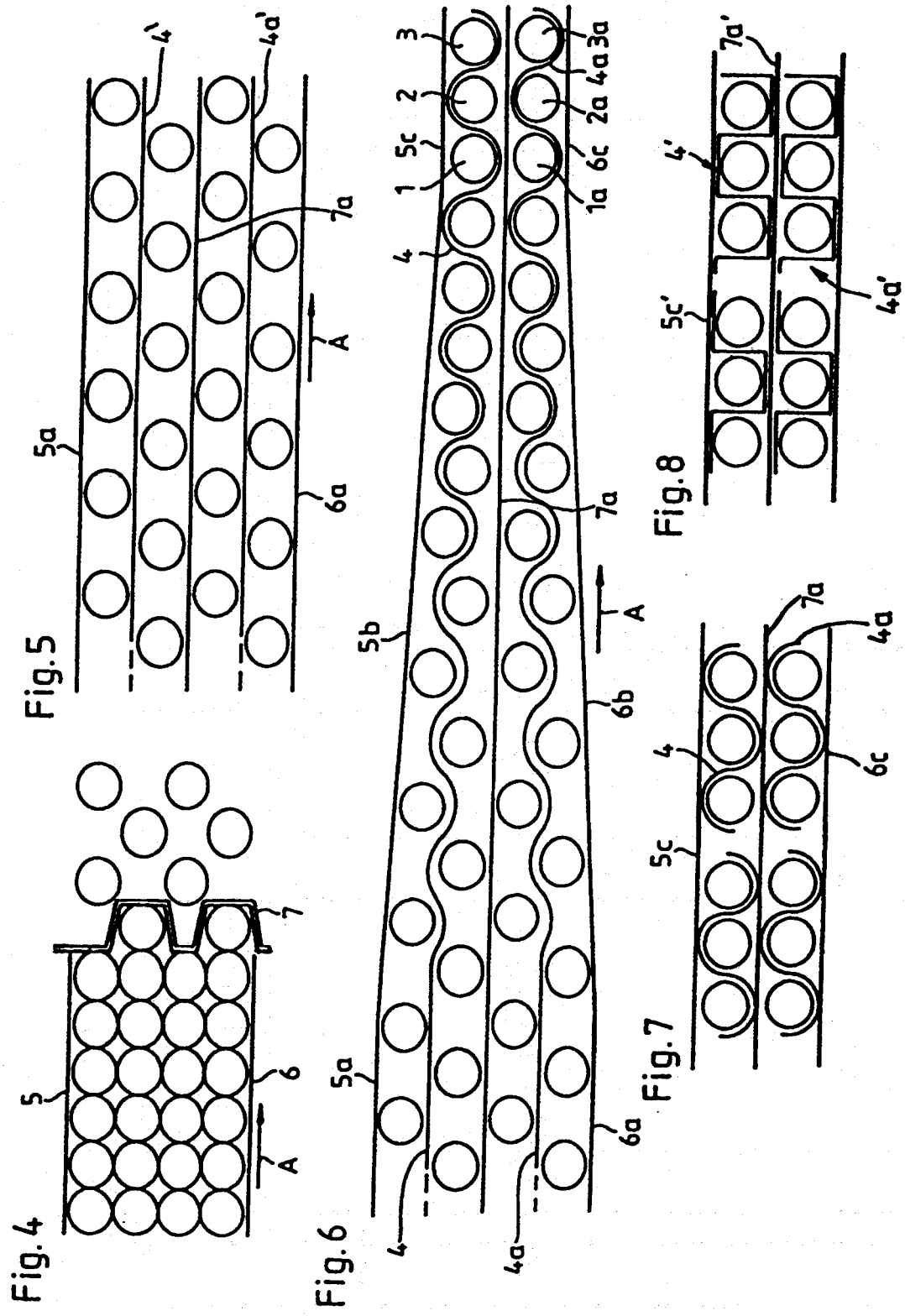

PROCESS FOR PRODUCTION OF SPACER MEANS FOR POSITIONING BETWEEN ARTICLES

BACKGROUND OF THE INVENTION

The invention concerns an arrangement of spacer means between articles such as containers for example bottles or the like, and a process for the production thereof.

The articles which are to be held in mutual relative positions by the arrangement of spacer means may preferably be containers comprising for example glass such as bottles or metal such as cans. For the purposes of transportation between manufacturing works and consumers, such articles generally require protective packaging to ensure that the articles or containers which are disposed in a packaging unit do not come into contact with each other. To provide protection of that kind for the articles, use can be made of spacers which are in the form of flat portions which extend between the articles, transversely to the plane of the bottom thereof, such spacers being for example in the form of partitions consisting of strips of cardboard each having slots extending partially across the width thereof, so that the strips of cardboard can be fitted together with the slots in interengaging relationship and with the strips of cardboard being disposed for example at right angles to each other in such a way as to define a grid-like structure in plan view to afford a plurality of boxes or compartments, into each of which a respective article can be fitted.

However packaging articles such as containers with spacers in the form of partitions of the above-indicated kind gives rise to problems insofar as the aim nowadays is to employ ever increasing packaging speeds, and the use of such partitions rows counter to the endeavour to achieve a high packaging speed, while in addition the use of spacers in the form of partitions involves a high level of expenditure on material.

SUMMARY OF THE INVENTION

An object of the present invention is to provide a spacer arrangement for articles which is so designed that the packaging speeds that can be achieved therewith can be considerably increased in comparison with the packaging speeds that can be attained with the prior partitions.

Another object of the present invention is to provide a spacer arrangement for positioning between articles, which affords a saving in material in comparison with prior packaging configurations.

Still another object of the present invention is to provide a process for the production of a spacer arrangement for positioning between articles, which can operate at an increased rate to enhance productivity.

Yet another object of the present invention is a process for the production of a spacer arrangement for articles, which is of a simple operational procedure.

In accordance with the present invention the foregoing and other objects are achieved by an arrangement of spacer means for use between articles to be separated from each other, for example containers such as bottles or cans, comprising at least one flat spacer portion which extends transversely to the plane of the bottom of the articles, and between the articles. The spacer portion is of a substantially meander-like configuration as viewed in plan, disposed between said articles which are arranged in at least one row. The meander-like configuration may be curved or angular and the spacer portion may be a honeycomb, strip, or apertured or perforated portion. It will therefore be noted in this respect that the term flat spacer portion does not signify any limitation to a portion which has a fully complete or solid surface, but rather the spacer portion, as indicated above, may involve a honeycomb-like portion, a portion in strip form or an apertured or perforated portion.

In accordance with another aspect of the invention the foregoing and other objects are achieved by a process for the production of an arrangement of spacer means for positioning between articles, wherein a flat spacer portion in the form of an upstanding substantially flat strip is introduced between articles which are initially disposed in first and second rows. The spacer portion is then forcibly shaped into a meander-like configuration as viewed in plan by the articles themselves, insofar as the first and second rows of articles are moved so as to constitute a single common row, with the articles in the respective first and second rows thus engaging between each other in the same manner as the teeth of a zip fastener engage between each other when the zip fastener is closed.

In accordance with a preferred feature of the invention at least first and second rows of articles are supplied in mutually displaced relationship and at a spacing in a transportation direction. The flat spacer portion is introduced between the articles in an upstanding position lengthwise and/or transversely to the direction of movement. The articles of the rows are then moved towards each other lengthwise or transversely to the transportation direction, in which operation the spacer portion, as viewed in plan, is deformed into a substantially meander-like configuration by virtue of contact thereof with the articles. The assembly of articles and spacer portion is then separated into a desired number of batches of articles which can then be provided with a suitable packaging therearound.

In accordance with another preferred feature of the invention a plurality of rows of articles can be held at a spacing by upstanding spacer portions each of a meander-like configuration.

It will be noted that the spacer portion does not need to have a flat surface. Production of the spacer portion is preferably effected on the basis of cardboard and/or foam material. In a particularly preferred configuration the foam material comprises material based on natural vegetable starch so that the foam material is biologically degradable and thus environmentally friendly.

Further objects, features and advantages of the present invention will be apparent from the following description of preferred embodiments.

BRIEF DESCRIPTION OF THE DRAWINGS

FIG. 4 is a diagrammatic plan view of an arrangement of articles which are initially supplied in closely adjacent relationship in four rows and which are moved into spaced relationship in such a way that the articles in adjacent rows are each transported in line with a gap between the articles in an adjacent row, FIG. 5 is a plan view of the articles transported in positions corresponding to the gaps between articles in adjacent rows, with flat spacer portions being introduced in upstarting relationship between the individual rows, FIG. 6 is a diagrammatic view of the process for producing the meander-like configuration of the spacer portions, FIG. 7 is a plan view of separated batches for the production of appropriate packaging units, and FIG. 8 is a view corresponding to that shown in FIG. 7 illustrating spacer portions of another configuration.

DESCRIPTION OF THE PREFERRED EMBODIMENT

Figure 1:
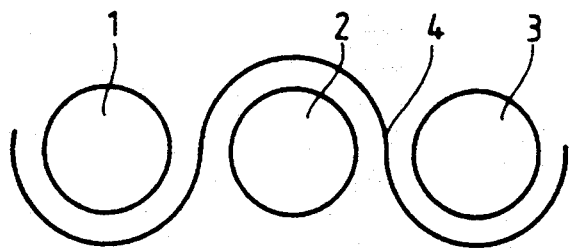
FIG. 1 is a plan view of three articles arranged in a row with, disposed therebetween, a flat spacer portion extending in a meander-like configuration in plan view, the assembly being shown in a partly exploded condition with gaps between the articles and the spacer portion, for the sake of clarity of the drawing.

Referring firstly to FIG. 1, diagrammatically shown therein in plan view are three articles illustrated in the form of containers 1, 2 and 3 of round cross-section. The containers 1, 2 and 3 are disposed in a package (not shown) such as for example a box, case or the like. In order to prevent the containers 1, 2 and 3 from coming into contact with each other at their sides, for example during transportation thereof, disposed between the containers 1, 2 and 3 are spacers which comprise a flat spacer portion 4 which, as viewed in plan, is of a substantially meander-like configuration. It will be seen that the meander-like configuration in FIG. 1 is of a curved nature, but it will be appreciated that the meander-like configuration could also be of an angular configuration. It will further be appreciated that the gaps illustrated between the spacer portion 4 and the containers 1, 2 and 3 do not exist in actual practice.

The spacer portion 4 can be produced for example on the basis of cardboard and/or foam and may for example have a flat surface on one side and a non-even such as a bumpy or knobbly surface on the opposite side. The at least one spacer portion 4 extends transversely to the plane of the bottom of the containers 1, 2 and 3 to be spaced thereby.

Figure 2:
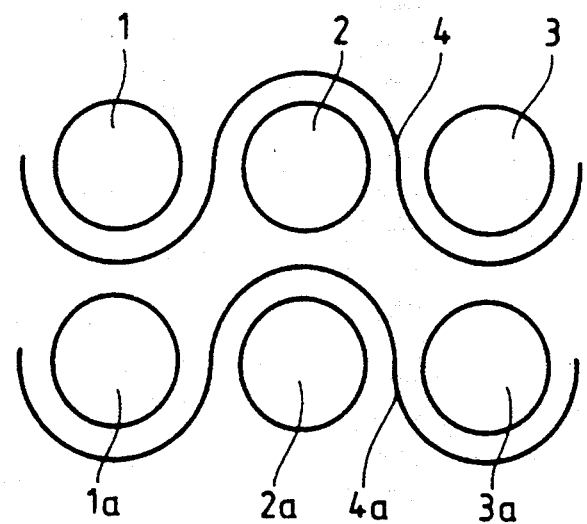
FIG. 2 is a plan view similar to that shown in FIG. 1 of an arrangement corresponding to that shown in FIG. 1 but with two rows each of three articles with two spacer portions extending in a meander-like configuration therebetween.

Looking now at FIG. 2, it will be seen that a plurality of rows of containers can be suitably held in position by means of the arrangement of spacer means according to the invention. In FIG. 2 the containers in one row are denoted by references 1, 2 and 3, as in FIG. 1, while the containers in the second row are denoted by reference numerals 1a, 2a and 3a. The spacer portion co-operating with the containers 1a, 2a and 3a is denoted by reference numeral 4a.

Figure 3:
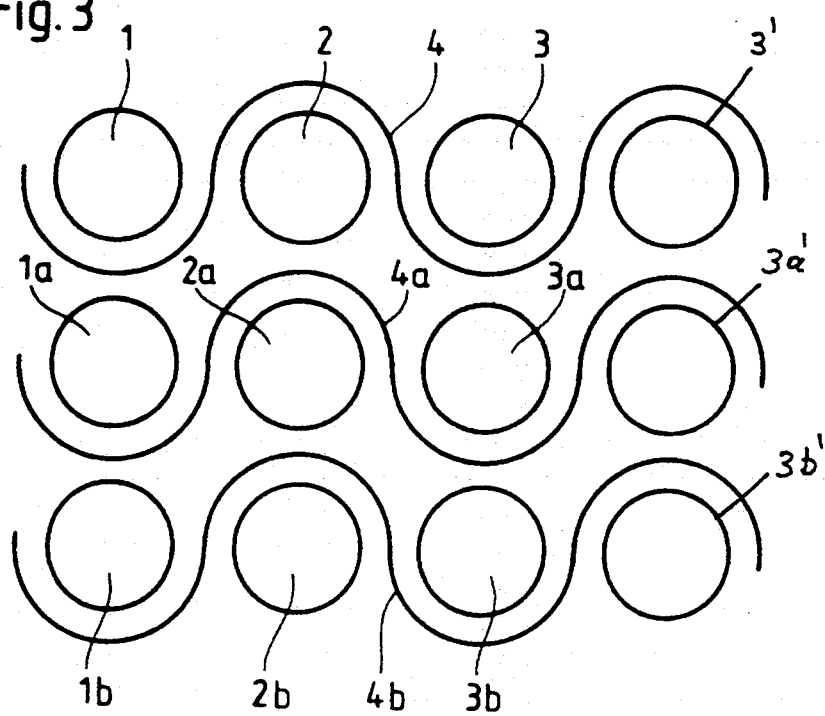
FIG. 3 shows a corresponding arrangement comprising three rows each having four articles therein.

FIG. 3 shows an assembly consisting of three rows each comprising four containers, the containers in the first row being denoted by references 1, 2, 3 and 3', the containers in the second row being denoted at 1a, 2a, 3a and 3a' and the containers in the third row being identified at 1b, 2b, 3b and 3b'. The spacer portions arranged in a meander-like configuration between the containers in the respective rows are denoted by references 4, 4a and 4b. The spacer means according to the invention not only hold the containers of a row at a spacing from each other, but they also hold the containers of juxtaposed rows at a spacing from each other. It can thus be seen for example from FIG. 3 that the containers 1a, 2a, 3a and 3a', that is to say containers in the 'middle' row, are held at the appropriate spacings from the containers of the other two rows on respective sides of the middle row, more specifically the spacer portion 4a acting as a spacer between the containers 1a and 1b, and then, progressing towards the right in FIG. 3, as a spacer between the containers 1a and 2a, and then, further progressing towards the right in FIG. 3, between the containers 2 and 2a, and so forth.

Reference will now be made to FIGS. 4 through 7 diagrammatically showing individual steps in a process for the production of an arrangement of spacer means for positioning between articles. FIG. 4 is a diagrammatic plan view of a transportation apparatus, for example a transportation belt, which at its sides has respective boundaries or edging members as illustrated at 5 and 6. A multiplicity of articles such as containers, for example bottles or cans, is transported on the transportation apparatus in the direction indicated by the arrow A, the articles or containers bearing snugly against each other and forming four rows in the lengthwise direction of the transportation apparatus or in the transportation direction A, that is to say, each line of containers across the transportation apparatus consists of four articles. Reference numeral 7 in FIG. 4 diagrammatically indicates a separating apparatus which is operable to adjust the containers of the individual rows to arrange them at spacings from each other in such a why that the containers in each row which extends lengthwise of the transportation apparatus are arranged in alignment with respective gaps between the containers in the respectively adjacent row. A flat strip-like element as indicated at 4' and 4a' in FIG. 5, which will subsequently form the spacer portions between the articles, is then introduced in an upstanding position between the respective individual rows of articles or containers on the transportation apparatus. It will be noted that the elements 4' and 4a' are not yet in a meander-like configuration but are each in the form of a flat or straight strip. It will further be noted from FIG. 5 that the outer boundaries or edgings of the transportation apparatus are at a greater spacing from each other at this phase in the procedure than in the apparatus as shown in FIG. 4, and are identified by references 5a and 6a respectively. A further spacer device 7a is disposed in the middle between the center two rows.

As can be seen from FIG. 6, the boundaries or edging members 5a and 6a converge by way of convergence regions 5b and 6b to a narrower spacing in parts of the apparatus in which the boundaries or edging members are identified by references 5c and 6c. It will be seen from FIG. 5 that the spacer device 7 remains constant and unaltered.

It will be noted however that, during the transportation movement of the containers arranged in the individual rows opposite gaps between respective containers in the adjacent rows, the containers in each two adjacent rows, on respective sides of the central spacer device 7a, are moved together so as to constitute a single common row upon continuing transportation movement towards the right in FIG. 6 in the direction indicated by the arrow A, so that the containers in the rows come into mutually engaged relationship in the same manner as the teeth of a zip fastener upon closure thereof. As a result of that mutual interengagement of the containers in the respectively adjacent rows, the strips 4' and 4a' are formed into a meander-like configuration in plan view, so that ultimately they assume the configurations indicated at 4 and 4a in FIG. 6. The containers disposed at the right-hand end of the assembly shown in FIG. 6 are denoted by the same references as the containers shown in FIG. 2. A similar consideration applies to the spacer portions which have been put into the meander-like configuration.

As can be seen from FIG. 7, the containers with the spacer portions therebetween are then passed to a separation station in which the meander-like spacer portions are severed in such a fashion that a desired number of batches of articles is embraced thereby, for example as shown in FIG. 7, each batch comprising two juxtaposed rows each containing three articles. A packaging for enclosing the respective batch (not shown) is then fitted. The arrangement and configuration shown in FIG. 7 is only given by way of example and many other configurations and arrangements are possible without thereby departing from the invention.

As mentioned above the term 'meander-like' in accordance with the present invention includes not only a configuration of the respective spacer portion as shown in FIGS. 1, 2, 3, 6 and 7, that is to say which is curved in plan view with an alternate arrangement of curvature reversal points, but also an angular meander-like configuration as viewed in plan view, as can be seen from FIG. 8. In FIG. 8 parts corresponding to those shown in FIG. 7 are denoted by the same references but with the addition of a prime ('). In this case the spacer portions 4' and 4a' are of an angular configuration in plan view.

The invention affords the advantage that the spacers can be continuously introduced into their appropriate positions at very high speed. A further advantage is that a very wide range of different articles, for example bottles or cans of widely different shapes, can be held in position at the appropriate spacings from each other by a spacer portion of one thickness, using a small amount of material. The number of desired batches or packaging units produced by means of a spacer portion can be easily varied so that an installation operating with a spacer portion in accordance with the invention can be used to produce packaging units containing for example three articles, six articles, twelve articles or twenty four articles. It is also possible to produce packs containing fifteen articles and eighteen articles, and any other combinations in regard to what are referred to as entire pallets.

As noted above, the spacer portion can be produced on the basis of cardboard and/or foam material, and the latter may be based on natural vegetable starch so as to be bio-degradable.

It will be appreciated that the above-described spacer portions and production processes have been set forth solely by way of example and illustration of the principles of the present invention and that various modifications and alterations may be made therein without thereby departing from the spirit and scope of the present invention. For example while in the process shown in FIGS. 4 through 7 the strip elements 4' and 4a' are introduced between the articles lengthwise of the direction of movement or transportation direction, they could be introduced transversely thereto. Similarly while the articles in the rows are moved towards each other transversely to the direction of movement, they could equally be moved lengthwise thereof, provided that the spacer portions are appropriately positioned.

What is claimed is:

1. A process for the production of an arrangement of spacer means for positioning between a plurality of articles, said plurality of articles being supplied in at least first and second rows of articles in mutually displaced relationship and at a spacing in a transportation direction, said process comprising the steps of: introducing a flat spacer portion in the form of a substantially upstanding substantially flat strip between said articles and moving said articles in said first and second rows towards each other as said articles are being moved in said transportation direction whereby said spacer portion is forcibly shaped into a meander-like configuration as viewed in plan by contact with said articles themselves as said first and second rows of said articles are moved together to constitute a common row thereof.

2. A process as set forth in claim 1 including the further step of separating said articles with said spacer portion into a desired number of batches of articles.

3. A process as set forth in claim 2 wherein said spacer portion is introduced between said articles lengthwise of the direction of movement of the articles.

4. A process as set forth in claim 2 wherein said articles of the respective rows are moved towards each other transversely to said transportation direction.

5. A process as set forth in claim 2 wherein a plurality of rows of articles are held at a spacing from each other by upstanding spacer portions of meander-like configuration.

* * * * *